3,078,277
STABILIZATION OF 6,7,8,9,10,10-HEXACHLORO-1,5,5a,6,9,9a-HEXAHYDRO - 6,9 - METHANO-2,4,3-BENZODIOXATHIEPIN-3-OXIDE WITH NITROGEN CONTAINING COMPOUNDS
Emil J. Geering, Grand Island, N.Y., assignor to Hooker Chemical Corporation, Niagara Falls, N.Y., a corporation of New York
No Drawing. Filed Mar. 23, 1959, Ser. No. 800,951
10 Claims. (Cl. 260—327)

This invention relates to a process for stabilizing 6,7,8,9,10,10 - hexachloro - 1,5,5a,6,9,9a - hexahydro - 6,9-methano - 2,4,3-benzodioxathiepin-3-oxide, hereinafter referred to as Thiodan, a registered trademark of Farbwerke Hoechst Aktiengesellshaft and to the new and stable compositions which are produced thereby.

"Thiodan" may be represented structurally as follows:

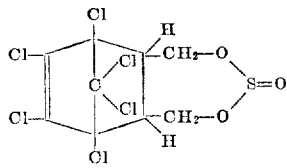

"Thiodan" may best be prepared by the method disclosed in copending application S.N. 733,500, filed May 7, 1958, now U.S. Patent No. 2,983,732. Therein cis-2-buten-1,4-diol is slowly added to an excess of hexachlorocyclopentadiene in the presence of a compound selected from the group consisting of alkali metal carbonates, alkaline earth metal carbonates, epoxides and mixtures thereof, and in the presence of a solvent. The Diels-Alder adduct thus obtained is then reacted with thionyl chloride to give "Thiodan."

"Thiodan" finds utility primarily as a herbicide, fungicide, and insecticide. "Thiodan" may also be used for protecting wood, paper, textiles and leather. Furthermore, "Thiodan" may be used as a disinfectant.

Commercial "Thiodan" is a solid which is susceptible to decomposition on storage under normal conditions. It should be pointed out that "Thiodan" differs markedly from other chlorinated Diels-Alder type insecticides in that it contains a sulfite ring. This presents unique stabilization problems. The rate of decomposition varies from an insignificant degree to several percent per week, and the rate is accelerated upon exposure to ultraviolet light. The decomposition products of "Thiodan" include 1,4,5,6,7,7 - hexachloro - 2,3 -bis(hydroxymethyl) - bicyclo-(2.2.1)-heptene-5, also known as 1,4,5,6,7,7-hexachlorobicyclo - (2.2.1) - hept - 5 - ene - 2,3 - dimethanol, and sulfur dioxide. Hydrogen chloride is evolved from some samples of "Thiodan." These decomposition products have little if any pesticidal activity of the type exhibited by "Thiodan." The formation of 1,4,5,6,7,7-hexachloro - 2,3 - bis(hydroxymethyl) - bicyclo - (2.2.1)-heptene-5 is undesirable because of its slight solubility in the solvents generally used in "Thiodan" formulations. The formation of sulfur dioxide and hydrogen chloride is undesirable because of their disagreeable odors. In addition, hydrogen chloride destroys the containers normally used to store "Thiodan," for example, standard fiber drums containing commercial "Thiodan" were weakened after thirty days to such an extent that the "Thiodan" spilled out onto the floor and the lacquered metal lids were severely corroded.

It is the primary object of this invention to provide a stable "Thiodan" composition.

It is a further object of the present invention to provide a method for preventing the loss of pesticidal activity of "Thiodan" during storage.

It is a still further object of the present invention to provide a method for preventing the formation of insoluble 1,4,5,6,7,7 - hexachloro - 2,3 - bis(hydroxymethyl)-bicyclo-(2.2.1)-heptene-5.

It is a still further object of the present invention to provide a method for preventing the formation of undesirable gases such as sulfur dioxide and hydrogen chloride.

A further object of the present invention is to provide a method for preventing the disintegration of "Thiodan" storage containers.

Another object of the present invention is to provide a method for prolonging the pesticidally-effective life of "Thiodan" after field application.

Further objects and advantages of the present invention will appear herein.

In accordance with the present invention it has now been found that the decomposition of "Thiodan" during storage under normal conditions as well as under such conditions as elevated temperatures or ultraviolet radiation is retarded by adding to "Thiodan" relatively small amount of certain chemicals, thus obtaining a product of improved stability. The chemical compounds which have now been found to act as stabilizers are compounds containing the radical

Preferably between about 0.01 and fifteen percent by weight of the chosen stabilizer of this invention is added to the "Thiodan" in order to realize the most advantageous results.

The following is an illustrative list of stabilizers contemplated by the present invention, it being emphasized that the list is intended as merely illustrative and not limitative.

Amides may be employed having the formula:

wherein each R is selected from the group consisting of hydrogen, alkyl, cycloalkyl, aryl, alkaryl and mixtures thereof. Examples of amides include formamide, acetamide, caproamide, capramide, acrylamide, oleamide, cinnamide, cyclopentanecarboxamide, phenylacetamide, N-methylformamide, N-cyclohexylcapramide, acetanilide, stear-p-toluide, phenylacetanilide, N,N-diphenylacetamide, etc.

Ureas may be employed having the formula:

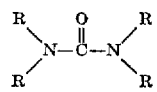

wherein each R is defined as above. Examples of ureas include urea, methylurea, sym-diallylurea, tetrabenzylurea, tetra-p-tolyurea, N,N'-di-p-tolyl-N,N'-dibenzylurea, cyclohexylurea, phenylurea, n-octadecylurea, etc.

Polyamides may be employed having the formula:

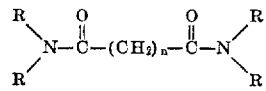

wherein each R is defined as above and n is an integer from 0–8. Examples of polyamides include oxamide, succinamide, malonanilide, N,N'-dimethyloxamide, adipamide, malonamide, ethylmalonamide,α,α-dimethylpimelamide, decandicarboxamide, etc.

Additionally, other compounds containing the radical

may be employed: such as imides, for example, succinimide, glutarimide, maleimide, 1,2-cyclohexanecarboximide, etc.; secondary and tertiary amides, for example, diacetamide, triacetamide, dipropionamide, etc.; barbituric acid and barbituric acid derivatives, for example 1,3-diethylbarbituric acid, 5-phenylbarbituric acid, 5,5-diethylbarbituric acid; etc.; isocyanuric acid; trimethylisocyanuric ester; parabanic acid; hydantoin; uracil; urazole, 2,5-diketopiperazine; acetylurea; diacetylurea; etc.

The preferred stabilizing compounds of the present invention are the amides and the ureas, and, in particular urea, foramide, acrylamide and acetanilide.

In using the stabilizing compounds of the present invention it should be understood that they are not necessarily equivalent in their effect and cannot necessarily be used to replace one another either on a weight or chemically equivalent basis. The quantity of the stabilizing compound used will vary with the particular stabilizer used, the method of incorporation and the degree of stabilization desired. The degree of stabilization desired will naturally depend upon the storage conditions such as time, temperature, etc. In general, however, from about 0.01 to about fifteen percent of stabilizer by weight of "Thiodan" will be effective.

The stabilizers of the present invention should preferably be incorporated with "Thiodan" in such a manner that the stabilizer is intimately and more or less uniformly distributed throughout the bulk of the "Thiodan," although good stabilization is obtained when the stabilizers of the present invention contact only a small percentage of the exposed "Thiodan" area. Alternatively, the stabilizer may be added to a solution of "Thiodan" and any convenient solvent, e.g., a solvent used in the manufacturing of the "Thiodan" or a solvent normally used in applying "Thiodan" as a pesticide, such as methylene chloride, chloroform, carbon tetrachloride, benzene, toluene, xylene, cyclohexane, cyclohexanone, etc. The solvent may or may not be subsequently removed or the "Thiodan" itself may be removed; that is, the solvent may be removed by a suitable method such as by distillation, or the "Thiodan" may be removed by a suitable method such as by crystallization, or the "Thiodan"-stabilizer-solvent solution may be used as a pesticidal formulation as such or after the addition of emulsifiers and other chemicals generally incorporated in pesticidal formulations. Although it is preferred that the stabilizer be added to the "Thiodan" in such a manner as to insure intimate distribution throughout the bulk of the "Thiodan," it is not intended that this invention be restricted by this preference. For example, stabilization may be achieved by passing molten "Thiodan" through a column of solid particles of an appropriate stabilizing material of the present invention, e.g., urea shot. It has also been shown, for example, that the rate of evolution of sulfur dioxide and hydrogen chloride from "Thiodan" may be significantly reduced by adding the stabilizer to the top of a mass of "Thiodan" flakes packed in a container.

The stabilizers may be either normally liquid or normally solid depending upon the particular stabilizer chosen. The stabilizer may be employed in their normal form, or may be employed in the form of a solution or emulsion with water and/or with an organic solvent if desired. A single stabilizer of this invention may be employed or mixtures of two or more different stabilizers may be employed.

The novel, stable compositions of the present invention may be stored with notably less decomposition than unstabilized "Thiodan." The presence of the stabilizer has been found to exert no deleterious effect as to herbicidal, fungicidal, insecticidal or other properties.

The data tabulated in Tables I, II and III were obtained from three experiments in which different samples of "Thiodan" were used. Each sample had a separate history of manufacture and previous storage and it is to be expected, therefore, that these samples will decompose at a different rate. Each sample listed in Tables IV and V represents different samples of "Thiodan," and again these should therefore decompose at different rates.

It was necessary to set up accelerated "Thiodan" decomposition tests in order to demonstrate in a relatively short period of time the effectiveness of the stabilizers disclosed in this invention. The storage of "Thiodan" at a temperature greater than room temperature and the exposure of "Thiodan" to ultraviolet radiation was the basis of two decomposition tests. These conditions, especially exposure to ultraviolet radiation, increase the rate of decomposition of "Thiodan." After field application "Thiodan" becomes exposed to sunlight; hence, the ultraviolet radiation test is of special significance in this regard. A method of treating "Thiodan" so that its stability under ultraviolet radiation is increased is of value in prolonging pesticidally the effective life of "Thiodan" after application in the field.

Accelerated decomposition tests were conducted by storing and periodically analyzing samples of "Thiodan" mixed with various stabilizers. Various compositions were stored for varying periods of time under continual exposure to ultraviolet light. To insure maximum exposure the "Thiodan" mixtures were spread in thin layers on glass surfaces suspended between ultraviolet radiators. The "Thiodan" samples were analyzed chemically and by infrared comparison with samples of known purity.

TABLE I

Assays of "Thiodan," Containing Varying Amounts of Formamide After Exposure to Ultraviolet Radiation for Varying Periods of Time

| Example | Percent of formamide | Weeks of ultraviolet exposure | | | | |
|---|---|---|---|---|---|---|
| | | 0 | 3 | 6 | 13 | 17 |
| 1 | 0 | 97 | 93 | 82 | 64 | 58 |
| 2 | 1.0 | 97 | 97 | 96 | 96 | 93 |
| 3 | 0.5 | 97 | 96 | 96 | 91 | 85 |
| 4 | 0.2 | 97 | 96 | 91 | 87 | 81 |

TABLE II

Assays of "Thiodan," Containing 0.5 Percent of Various Stabilizers, After Exposure to Ultraviolet Radiation for Varying Periods of Time

| Example | Stabilizer | Weeks of ultraviolet exposure | | | | |
|---|---|---|---|---|---|---|
| | | 0 | 6 | 12 | 19 | 32 |
| 5 | none | 97 | 94 | 67 | 49 | |
| 6 | urea | 97 | 96 | 93 | 90 | 87 |
| 7 | formamide | 97 | 97 | 92 | 82 | 67 |
| 8 | acrylamide | 97 | 96 | 92 | 84 | 67 |
| 9 | acetamide | 97 | 95 | 91 | 78 | 63 |
| 10 | N-methyl formamide | 97 | 97 | 89 | 73 | |
| 11 | acetanilide | 97 | 94 | 88 | 85 | 79 |
| 12 | succinimide | 97 | 92 | 87 | 67 | |
| 13 | phenylacetamide | 97 | 97 | 86 | 75 | 41 |
| 14 | adipamide | 97 | 92 | 84 | 75 | 52 |
| 15 | caproamide | 97 | 95 | 77 | 63 | |

TABLE III

Assays of "Thiodan" Containing 0.5 Percent of Formamide After Storage at 70° C. for Varying Periods of Time

| Example | Stabilizer | Weeks of storage at 70° C. | | |
|---|---|---|---|---|
| | | 0 | 18 | 31 |
| 16 | none | 94 | 94 | 83 |
| 17 | formamide | 94 | 94 | 94 |

The stabilizers disclosed in this invention are effective in reducing or eliminating the evolution of sulfur dioxide and hydrogen chloride. Data is presented in Table IV concerning the effect of formamide on hydrogen chloride and sulfur dioxide evolution from various and distinct samples of "Thiodan" that had been stored in glass jars at room temperature. Of the two gases, only hydrogen chloride fumes in moist air. This was the basis for a qualitative test for this gas over the "Thiodan" samples. Odor is a good indication of the presence of both sulfur dioxide and hydrogen chloride and is recorded in Table IV as heavy, moderate, slight and bland.

TABLE IV

*Assay, Odor, and Hydrogen Chloride Evolution After Storage of Various Samples of "Thiodan" Stabilized With 0.5 Percent of Formamide*

| Example | Original assay | After eighteen weeks' storage | | | | | |
|---|---|---|---|---|---|---|---|
| | | No stabilizer | | | Contained formamide | | |
| | | Assay | Odor | HCl | Assay | Odor | HCl |
| 18 | 98 | 97 | heavy | yes | 97 | bland | no. |
| 19 | 93 | 88 | heavy | yes | 91 | bland | no. |
| 20 | 91 | 70 | slight | slight | 92 | bland | no. |
| 21 | 94 | 73 | heavy | yes | 91 | bland | no. |
| 22 | 95 | 85 | heavy | yes | 89 | bland | no. |

It is not necessary to intimately mix the stabilizer with "Thiodan" in order to obtain stabilization. The previous tables listed examples of stabilized "Thiodan" in which the stabilizer was added to molten "Thiodan" and the mixture stirred well before solidification was allowed to occur. The "Thiodan" comparisons listed in Table V were prepared by adding five percent of formamide to separate and distinct samples of solid flaked "Thiodan." The formamide was partially mixed with the "Thiodan" flakes and contacted only a small percentage of the exposed "Thiodan" area.

TABLE V

*Odor and Hydrogen Chloride Evolution of Various Samples of "Thiodan" Stabilized by Adding 0.5 Percent of Formamide to Solid "Thiodan" Flakes and Stored Eighteen Weeks*

| Example | No stabilizer | | Contained formamide | |
|---|---|---|---|---|
| | Odor | HCl | Odor | HCl |
| 23 | moderate | no | slight | no. |
| 24 | moderate | no | slight | no. |
| 25 | heavy | yes | moderate | no. |
| 26 | heavy | yes | slight | no. |
| 27 | heavy | yes | slight | no. |

This invention may be embodied in other forms or carried out in other ways without departing from the spirit or essential characteristics thereof. The present embodiment is therefore, to be considered as in all respects illustrative and not restrictive, the scope of the invention being indicated by the appended claims, and all changes which come within the meaning and range of equivalence of the claims are intended to be embraced therein.

I claim:

1. A composition of matter consisting essentially of 6,7,8,9,10,10-hexachloro-1,5,5a,6,9,9a - hexahydro - 6,9-methano-2,4,3-benzodioxathiepin-3-oxide, and as a stabilizer therefor, which retards decomposition, from about 0.01 to about 15% by weight of a compound containing the radical:

which compound is selected from the group consisting of amides having the formula:

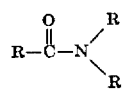

wherein each R is selected from the group consisting of hydrogen, alkyl, cycloalkyl, aryl, alkaryl, and mixtures thereof, ureas having the formula:

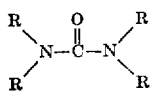

wherein each R is selected from the group consisting of hydrogen, alkyl, cycloalkyl, aryl, alkaryl, and mixtures thereof, polyamides having the formula:

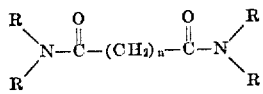

wherein each R is selected from the group consisting of hydrogen, alkyl, cycloalkyl, aryl, alkaryl, and mixtures thereof, and $n$ is an integer from 0 to 8, succinimide, glutarimide, maleimide, 1,2-cyclohexanecarboximide, diacetamide, triacetamide, dipropionamide, 1,3-diethylbarbituric acid, 5-phenylbarbituric acid, 5,5-diethylbarbituric acid, isocyanuric acid, trimethylisocyanuric ester, parabanic acid, hydantoin, uracil, urazone, 2,5-diketotopiperazine, acetylurea, and diacetylurea.

2. A composition of matter according to claim 1 wherein said stabilizer is an amide having the formula:

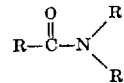

wherein each R is selected from the group consisting of hydrogen, alkyl, cycloalkyl, aryl, alkaryl, and mixtures thereof.

3. A composition of matter according to claim 1 wherein said stabilizer is an urea having the formula:

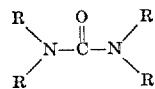

wherein each R is selected from the group consisting of hydrogen, alkyl, cycloalkyl, aryl, alkaryl, and mixtures thereof.

4. A composition of matter according to claim 1 wherein said stabilizer is a polyamide having the formula:

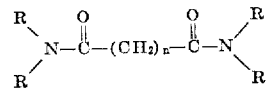

wherein each R is selected from the group consisting of hydrogen, alkyl, cycloalkyl, aryl, alkaryl, and mixtures thereof.

5. A composition of matter according to claim 1 wherein said stabilizer an imide selected from the group consisting of succinimide, glutarimide, maleimide, and 1,2-cyclohexanecarboximide.

6. A composition of matter according to claim 2 wherein said stabilizer is formamide.

7. A composition of matter according to claim 2 wherein said stabilizer is acrylamide.

8. A composition of matter according to claim 2 wherein said stabilizer is acetanilide.

9. A composition of matter according to claim 3 wherein said stabilizer is urea.

10. A process for stabilizing 6,7,8,9,10,10-hexachloro-1,5,5a,6,9,9a - hexahydro - 6,9 - methano-2,4,3 - benzodioxathiepin-3-oxide which comprises adding thereto as a stabilizer therefor which retards decomposition from about 0.01 to about fifteen percent by weight of a compound containing the radical

which compound is selected from the group consisting of amides having the formula:

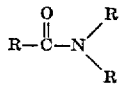

wherein each R is selected from the group consisting of hydrogen, alkyl, cycloalkyl, aryl, alkaryl, and mixtures thereof, ureas having the formula:

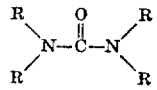

wherein each R is selected from the group consisting of hydrogen, alkyl, cycloalkyl, aryl, alkaryl, and mixtures thereof, polyamides having the formula:

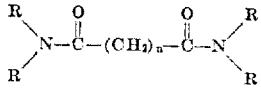

wherein each R is selected from the group consisting of hydrogen, alkyl, cycloalkyl, aryl, alkaryl, and mixtures thereof, and $n$ is an integer from 0 to 8, succinimide, glutarimide, maleimide, 1,2-cyclohexanecarboximide, diacetamide, triacetamide, dipropionamide, 1,3-diethylbarbituric acid, 5-phenylbarbituric acid, 5,5-diethylbarbituric acid, isocyanuric acid, trimethylisocyanuric ester, parabanic acid, hydantoin, uracil, urazole, 2,5-diketopiperazine, acetylurea, and diacetylurea.

No references cited.